United States Patent
Romak

(10) Patent No.: US 6,612,406 B1
(45) Date of Patent: Sep. 2, 2003

(54) EMERGENCY BRAKING DEVICE

(76) Inventor: Bruce J. Romak, Mile 58 Alaska Hwy., SS2, Site 18, Comp 1, Fort St. John, British Columbia (CA), V1J 4M7

( * ) Notice: Subject to any disclaimer, the term of this patent is extended or adjusted under 35 U.S.C. 154(b) by 0 days.

(21) Appl. No.: 10/065,847

(22) Filed: Nov. 25, 2002

(51) Int. Cl.[7] ............................... F16C 1/12; B60T 7/14
(52) U.S. Cl. ................... 188/2 D; 180/272; 74/501.6
(58) Field of Search ................ 74/488, 489, 500.5, 74/501.6, 502.2; 180/272; 188/2 D

(56) References Cited

U.S. PATENT DOCUMENTS

| | | |
|---|---|---|
| 3,957,131 A | 5/1976 | Perkins |
| 5,642,788 A * | 7/1997 | Mabbott ............ 180/272 |
| 6,000,487 A | 12/1999 | Caple |
| 6,412,583 B1 * | 7/2002 | Caple ............ 180/190 |

* cited by examiner

Primary Examiner—Christopher P. Schwartz
(74) Attorney, Agent, or Firm—John J. Elnitski, Jr.

(57) ABSTRACT

An emergency brake device for a vehicle with a lever activated braking system which includes a lever, impact point part, plunger, plunger housing, plunger retaining system, plunger release system and a tether cable. The lever activates the braking system and includes a rotational point. The lever has a hand activation section on one side of the rotational point and a body section on other of the rotational point. The impact point part is near the body section. The plunger housing houses the plunger and is attached to the body section. The plunger retaining system holds the plunger in the plunger housing. The plunger release system releases the plunger. The tether cable is attached to the plunger release system.

20 Claims, 5 Drawing Sheets

EMERGENCY BRAKING DEVICE

BACKGROUND OF INVENTION

The present invention generally relates to emergency braking devices for stopping vehicles which are no longer under the control of a user. More specifically, the present invention relates to emergency braking devices for use on recreational vehicles such as ATVs and snowmobiles that need to be stopped due to accidental dismounting of the user.

It is a principal problem with a number of vehicles, particularly recreational vehicles such as ATVs and snowmobiles, that in an emergency situation the brake is not automatically applied, or must be applied by manual pressure. These recreational vehicles have an inherent design characteristic that lacks seatbelts or other restraining devices which would prevent separation of the user from the vehicle in the event that the user loses control of the vehicle. The engine is almost invariably permitted to continue an operation after accidental dismounting of the user. With ATVs and snowmobiles, the problem is further compounded by the typical handle bar throttle control, and the straddle, perch-like saddle on which the user may be more captive than in control. Thus, the user may be thrown or not in control and the vehicle may continue to move under power for lack of application of the brakes. This is especially so if the throttle cable is damaged or becomes stuck, and the engine remains in a high operating speed through the emergency.

There are many devices on the market to aid in stopping a vehicle when the user is accidentally dismounted from the vehicle. These devices are usually associated with the braking or engine systems of the vehicle. The usual device associated with engine systems is a engine kill switch. This type of device can complicate the engine system of a vehicle and cause engine system malfunctions due to its integration into the engine system. Also, the engine kill switch does not quickly reduce the motion of the vehicle. Devices associated with brake systems are usually integrated with the brake cable or brake lever. These devices aid in quickly stopping the vehicle and can be used alone or in conjunction with an engine kill switch. Most of these devices either involve a series of parts combined in a complicated manner or use a spring system which lacks strength to confidently activate the braking system.

It is an object of the present invention to provide an emergency braking device which is not complicated, yet provides enough strength to stop the vehicle.

SUMMARY OF INVENTION

An emergency brake device for a vehicle with a lever activated braking system which includes a lever, impact point part, plunger, plunger housing, plunger retaining system, plunger release system and a tether cable. The lever activates the braking system and includes a rotational point. The lever has a hand activation section on one side of the rotational point and a body section on other of the rotational point. The impact point part is near the body section. The plunger housing houses the plunger and is attached to the body section. The plunger retaining system holds the plunger in the plunger housing. The plunger release system releases the plunger. The tether cable is attached to the plunger release system.

DETAILED DESCRIPTION

Figure 1:
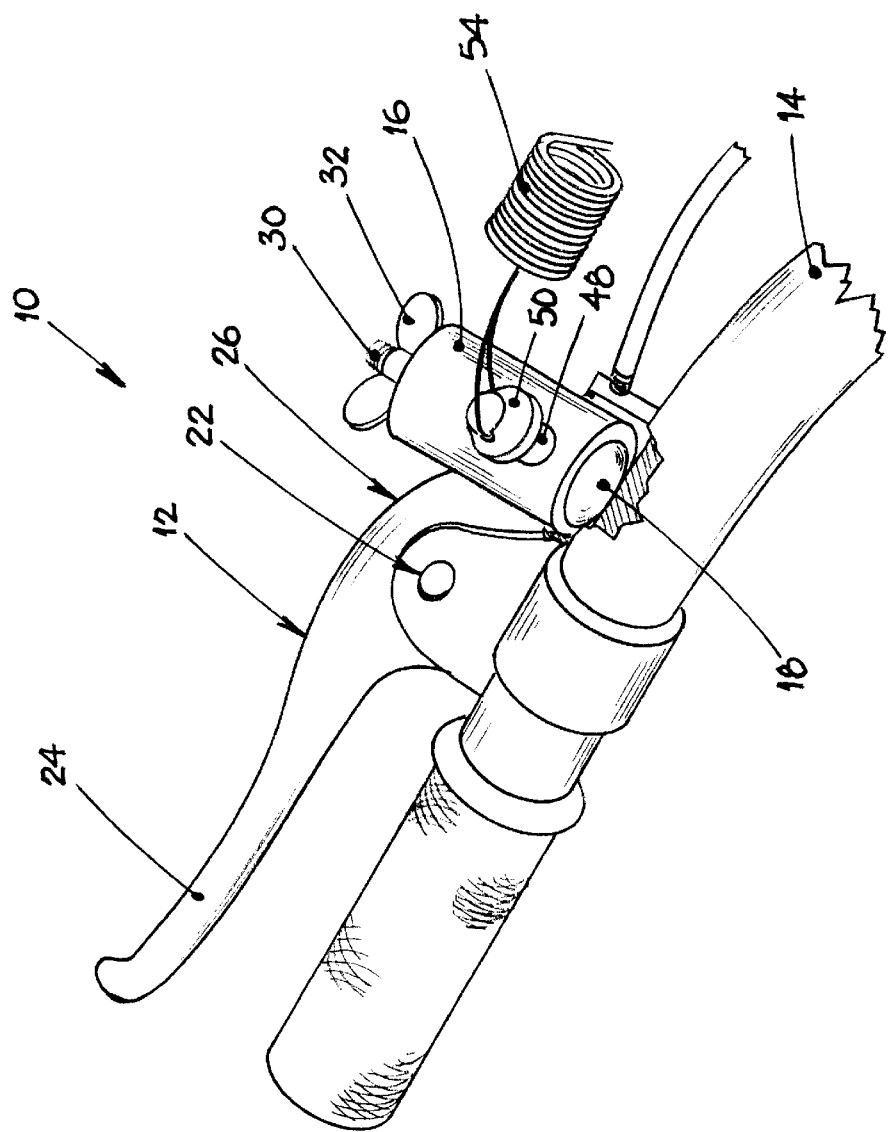
FIG. 1 is a perspective view of an emergency braking device prepared for activation according to the present invention.

The present invention is an emergency braking device 10, as shown in FIGS. 1–5. The emergency braking device 10 is attached or is an integral part of the brake lever 12 of a vehicle. The brake lever 12 is usually attached to the handle bar 14 of the vehicle, as shown in FIG.s. The emergency braking device 10 includes a plunger housing 16, plunger 18, main spring 20, plunger retaining system and a plunger release system.

Figure 3:
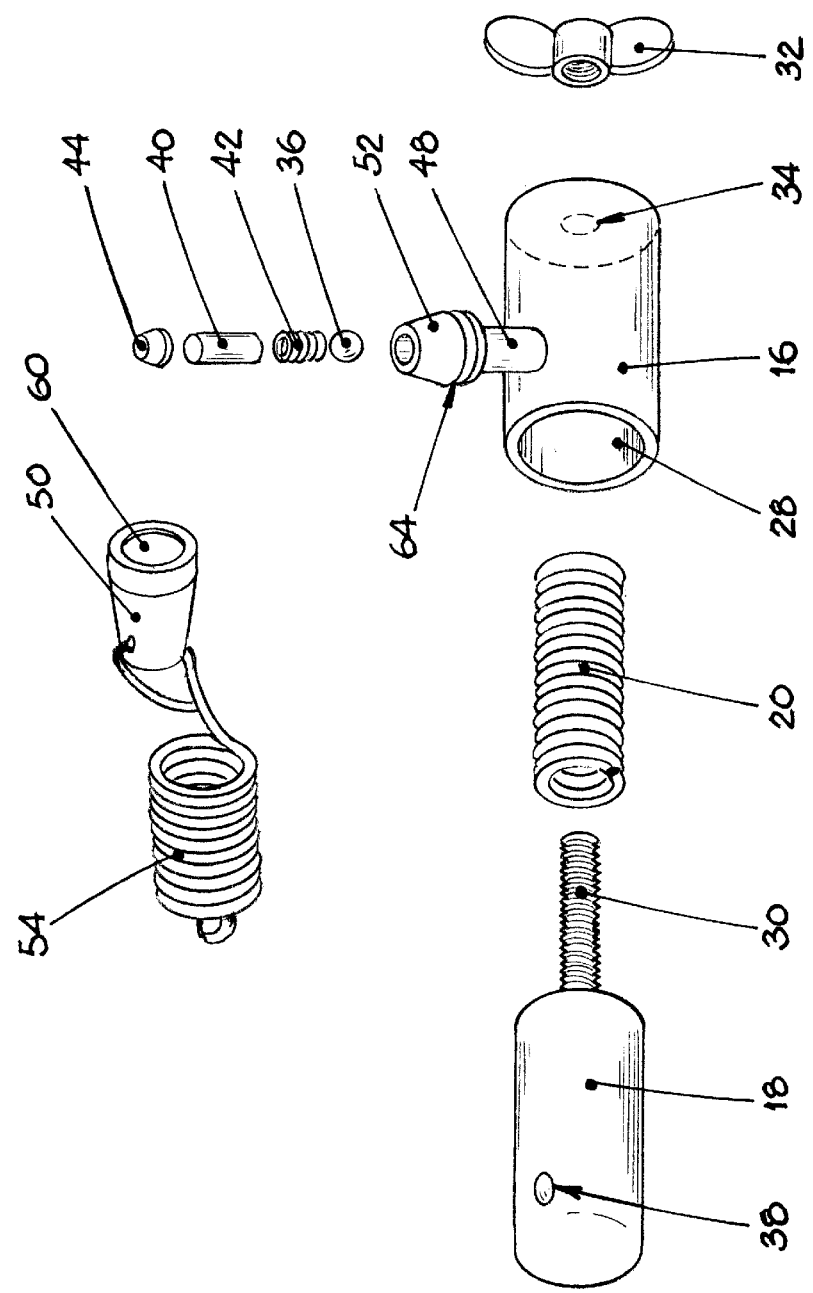
FIG. 3 is an exploded view of the components of the emergency braking device according to the present invention.
Figure 4:
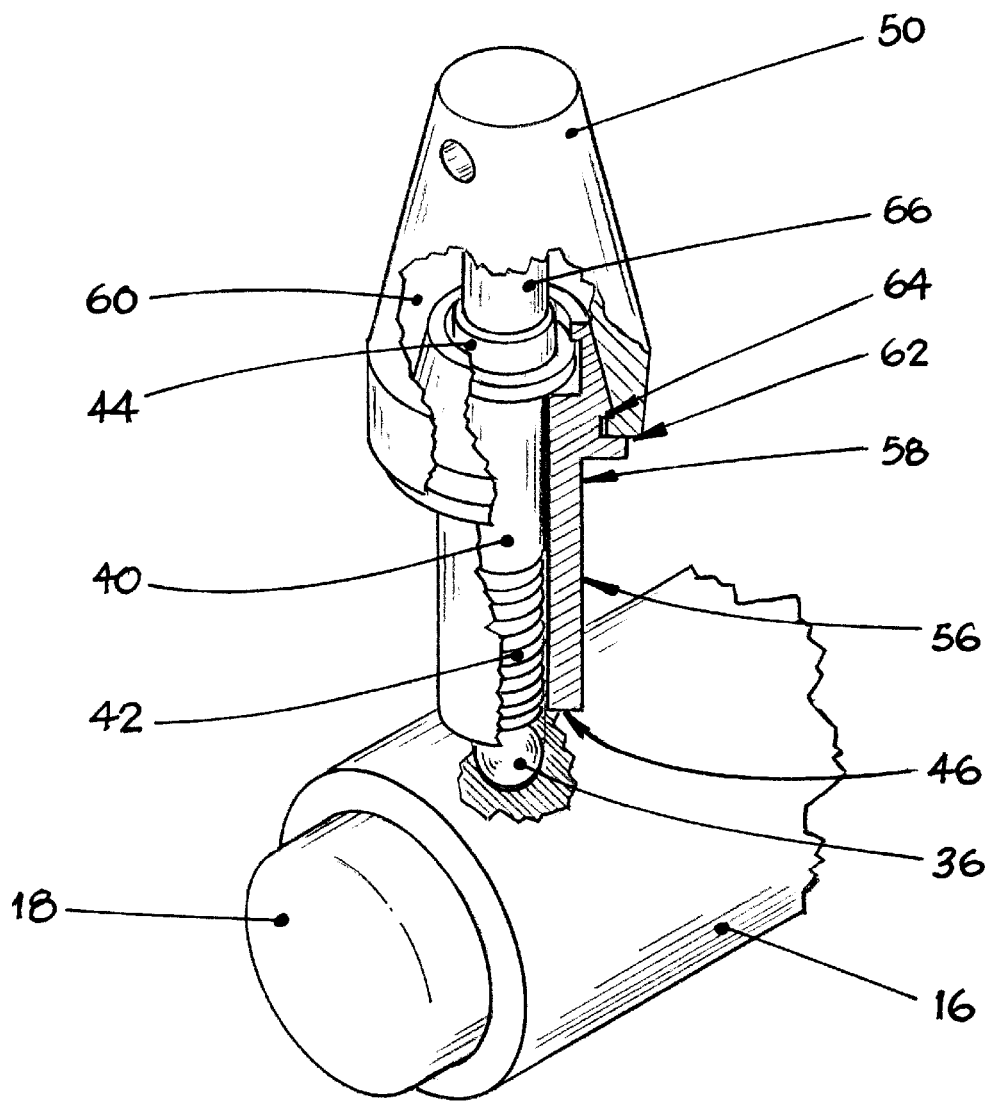
FIG. 4 is a cut-a-way view of the components of the emergency braking device prepared for activation according to the present invention.
Figure 5:
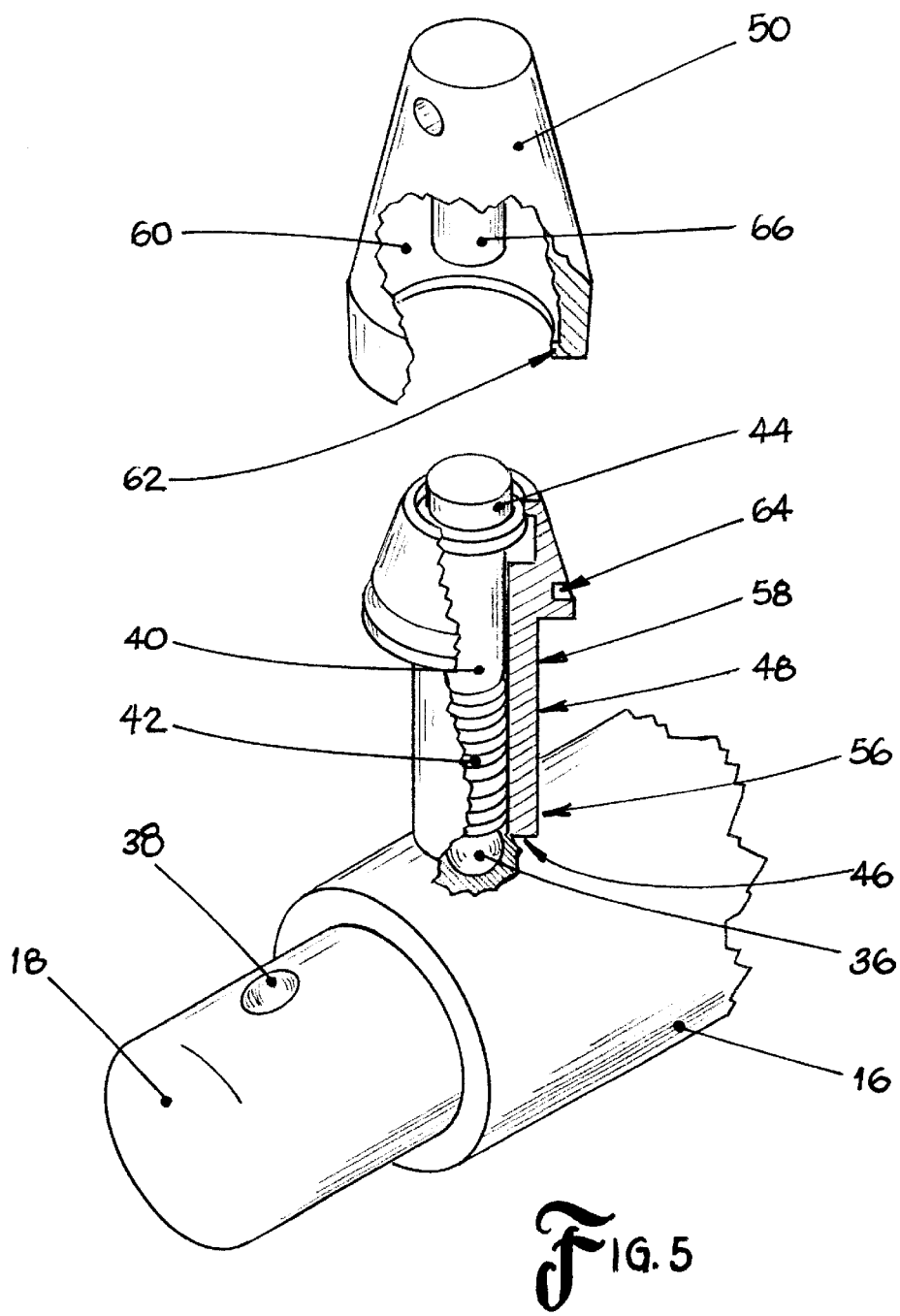
FIG. 5 is a cut-a-way view of the components of the emergency braking device activated according to the present invention.

The plunger housing 16 is firmly attached to the brake lever 12. Most brake levers 12 have a rotational point 22, in which the lever 12 rotates as it is pulled by the user. The brake lever 12 usually includes a hand activation section 24 on a first side of the rotational point 22 and a body section 26 on a second side of the rotational point 22. The plunger housing 16 should be mounted on the body section 26 of the lever 12, such that the rotational point 22 is between the hand activation section 24 and the plunger housing 16. The plunger 18 is retained in the plunger housing 16 by plunger housing 16 and the plunger retaining system, as shown in FIGS. 3–5. The plunger housing 16 includes a plunger opening at the front of the plunger housing 16 to receive the plunger 18. The plunger opening faces the handle bar 14. The plunger retaining system shown is a threaded rod 30 attached to the rear of the plunger 18, a wing nut 32 and a rod hole 34 in a closed rear of the plunger housing 16. The main spring 20 is placed over the threaded rod 30. The main spring 20 and plunger 18 are inserted into the plunger opening, such that the threaded rod 30 extends out the rod hole 34 of the plunger housing 16. The wing nut 32 is attached to the threaded rod 30 and prevents removal of the plunger 18 from the plunger housing 16 and places a load on the main spring 20. The plunger retaining system shown is one way to retain the plunger 18 in the plunger housing 16. It is envisioned there are numerous other methods to retain the plunger 18 in the plunger housing 16 and load the main spring 20. Whereby, those methods can be employed with the emergency braking device 10.

The plunger release system includes a ball 36, ball detent 38, a pin 40, a release spring 42, a pin retainer 44, a housing ball hole 46, a tube 48, a retaining cap 50, a retaining cap head 52 and a tether cable 54, as shown in FIGS. 3–5. The tube 48 is a hollow open-ended tube 48 to hold the ball 36, release spring 42 and the pin 40. The tube 48 has a housing end 56 and a cap end 58. The retaining cap head 52 is attached to the cap end 58 of the tube 48. The housing end 56 of the tube 48 is attached to the plunger housing 16, such that the opening at the housing end 56 of the tube 48 is aligned with the housing ball hole 46 in the plunger housing 16. The housing ball hole 46 is at least large enough to allow at least a portion of the ball 36 to pass into the plunger housing 16. With the plunger 18 positioned in the plunger housing 16, the ball 36 is inserted into the cap end 58 of the tube 48. Then, the release spring 42 is inserted into the cap end 58 and finally, the pin 40 is inserted into the cap end 58. The pin retainer 44 is a rubber cap which fits over the pin 40 and into the opening of the cap end 58 of the tube 48. The pin retainer 44 remains inside the tube 48 due to frictional forces between the pin retainer 44 and the tube 48. The retaining cap 50 is made of a slightly flexible material. The retaining cap 50 includes a hollow cavity 60 which fits over the retaining cap head 52. The retaining cap 50 includes a lip 62 to catch on an outside edge 64 of the retaining cap head 52. Also, the retaining cap 50 includes a pressure stud 66 in the center of the hollow cavity 60 of the retaining cap 50. The ball detent 38 is a detent formed in the plunger 18.

Figure 2:
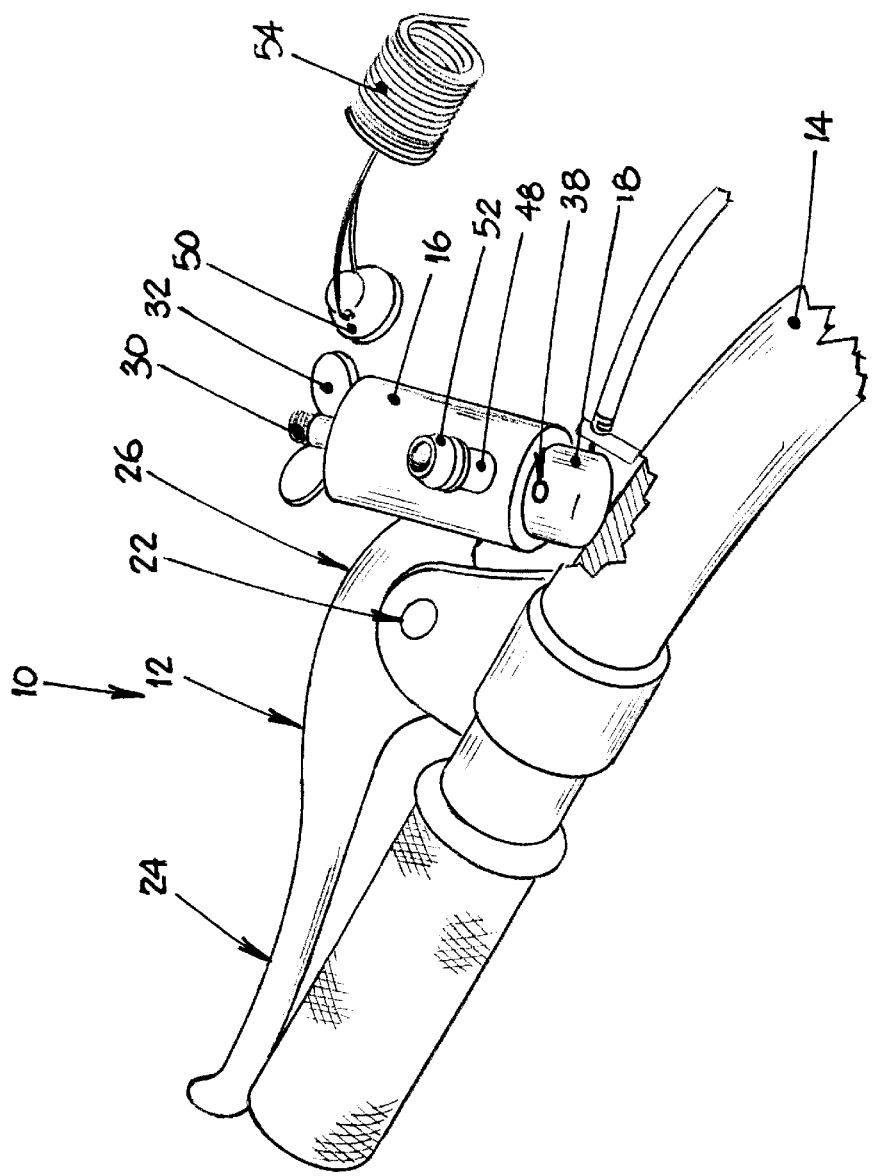
FIG. 2 is a perspective view of the emergency braking device activated according to the present invention.

The use of the emergency braking device 10 is as follows. The wing nut 32 is tighten until the main spring 20 is compress and applies pressure to force the plunger 18 away from the plunger housing 16 and towards the handle bar 14. The pin retainer 44 applies enough friction to hold the pin 40, release spring 42 and ball 36 in the tube 48. The retaining cap 50 is positioned over the retaining cap head 52 and forced onto the retaining cap head 52. The lip 62 of the retaining cap 50 catches on the outside edge 64 of the retaining cap head 52 and requires force to remove the retaining cap 50 from the retaining cap head 52. When the retaining cap 50 is attached to the retaining cap head 52, the pressure stud 66 applies pressure against the pin retainer 44 and the pin 40. The tether cable 54 is attached to the retaining cap 50 and the user. The emergency braking device 10 is prepared by forcing the plunger 18 into the plunger housing 16, while aligning the ball detent 38 of the plunger 18 with the housing ball hole 46, as shown in FIG. 4. At the same time, the retaining cap 50 is applied to the retaining cap head 52 so that the pressure stud 66 forces the pin 40 to move towards the housing ball hole 46 and against the release spring 42. The release spring 42 forces at least a portion of the ball 36 into the ball detent 38 and holds the plunger 18 in place. To activate the emergency brake device, the tether cable 54 is pulled along with the dismounted user to which the tether cable 54 is attached, as shown in FIG. 5. The tether cable 54 pulls the retaining cap 50 from the retaining cap head 52. This releases the pressure of the pressure stud 66 against the pin 40. The release spring 42 pushes the pin 40 away and allows the ball 36 to fall away from the housing ball hole 46 and the ball detent 38. Removal of the ball 36 from the ball detent 38, allows the plunger 18 to be released and move towards the handle bar 14. The plunger 18 moves towards the handle bar 14, due to the pressure from the compressed main spring 20 moving the plunger 18 outward from the plunger housing 16. The plunger 18 in turn presses against the handle bar, 14 and forces the lever 12 to rotate in a manner similar to the user pulling on the lever 12, as shown in FIG. 2. This rotation of the lever 12 by the plunger 18 activates the brakes of the vehicle. The plunger housing 16 is positioned closely to the handle bar 14, such that when the plunger 18 releases from the plunger housing 16, the force of the main spring 20 against the plunger 18 is enough to rotate the lever 12. Whereby, the handle bar 14 acts as an impact point for the plunger 18. It is also, envisioned that the plunger 18 does not have to interact with the handle bar 14, but any firmly attached part of vehicle could act as the impact point, as long as it forces the rotation of the lever 12.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

what is claimed is:

1. An emergency brake device for a vehicle with a lever activated braking system, comprising:
    a lever with a rotational point to activate said braking system, said lever having a hand activation section on a first side of said rotational point and a body section on a second side of said rotational point;
    an impact point part near said body section;
    a plunger, said plunger having a front and a rear, said plunger being spring loaded;
    a plunger housing to house said plunger, said plunger housing having a body with an open end facing said impacts point part and a spring retaining end opposite said open end, said plunger housing attached to said body section of said lever and near said impact point part, such that when activated, said plunger strikes said impact point part and rotates said lever about said rotational point and activates said braking system of said vehicle;
    a plunger retaining system to hold said plunger in said plunger housing and allow movement of said plunger towards said impact point part;
    a plunger release system; and
    a tether cable with a first end attached to a user of said vehicle and with a second end attached to said plunger release system.

2. The emergency brake device of claim 1, wherein a main spring is positioned between said rear of said plunger and said spring retaining end of said plunger housing to spring load said plunger.

3. The emergency brake device of claim 2, wherein said plunger retaining system includes a threaded rod extending outward from said rear of said plunger and towards said spring retaining end of said plunger housing; wherein said spring retaining end of said plunger housing is a closed end with a rod hole to allow said threaded rod extend out said plunger housing; wherein said main spring is positioned over said threaded rod and between said rear of said plunger and said closed end of said plunger housing; and further including a nut threaded onto said threaded rod on an outside of said plunger housing to compress said main spring between said rear of said plunger and said closed end of said plunger housing to spring load said plunger.

4. The emergency brake device of claim 3, wherein said plunger release system comprises:
    a ball detent on said plunger and near said front of said plunger;
    a housing ball hole in said body of said plunger housing and near said open end of said plunger housing;
    a tube having an open housing end and an open cap end, said housing end attached to said plunger housing such that said opening of said housing end is aligned with said housing ball hole;
    a ball which is inserted into said cap end of said tube and towards said housing ball hole to interact with said ball detent;
    a release spring which is inserted into said cap end of said tube and against said ball;
    a pin which is inserted into said cap end of said tube and against said release spring;
    a pin retainer to attached to said tube at said cap end to retain said pin, release spring and ball in said tube; and
    a cap attached in a releasable manner to said cap end of said tube to pressure said pin into said spring, which pressures said ball into said ball detent to hold said plunger in a loaded position in said plunger housing, and wherein said second end of said tether cable is attached to said cap.

5. The emergency brake device of claim 4, further including a retaining cap head attached to said cap end of said tube for receiving said cap; wherein said retaining cap head includes an edge; and wherein said cap includes a hollow cavity which fits over said retaining cap head; where said cap includes a lip to catch said edge of said retaining cap head; and wherein said cap includes a pressure stud in said hollow cavity of said cap to pressure said pin.

6. The emergency brake device of claim 5, further including a retaining cap head attached to said cap end of said tube for receiving said cap; wherein said retaining cap head includes an edge; and wherein said cap includes a hollow cavity which fits over said retaining cap head; where said cap includes a lip to catch said edge of said retaining cap head; and wherein said cap includes a pressure stud in said hollow cavity of said cap to pressure said pin.

7. The emergency brake device of claim 6, wherein said impact point part is a handle bar of said vehicle.

8. The emergency brake device of claim 5, wherein said impact point part is a handle bar of said vehicle.

9. The emergency brake device of claim 4, wherein said pin retainer is a flexible cap which is inserted into said tube and retains said pin, release spring and ball in said tube due to frictional forces between said flexible cap and said tube.

10. The emergency brake device of claim 9, wherein said impact point part is a handle bar of said vehicle.

11. The emergency brake device of claim 4, wherein said impact point part is a handle bar of said vehicle.

12. The emergency brake device of claim 3, wherein said impact point part is a handle bar of said vehicle.

13. The emergency brake device of claim 1, wherein said plunger release system comprises:
   a ball detent on said plunger and near said front of said plunger;
   a housing ball hole in said body of said plunger housing and near said open end of said plunger housing;
   a tube having an open housing end and an open cap end, said housing end attached to said plunger housing such that said opening of said housing end is aligned with said housing ball hole;
   a ball which is inserted into said cap end of said tube and towards said housing ball hole to interact with said ball detent;
   a release spring which is inserted into said cap end of said tube and against said ball;
   a pin which is inserted into said cap end of said tube and against said release spring;
   a pin retainer to attached to said tube at said cap end to retain said pin, release spring and ball in said tube; and
   a cap attached in a releasable manner to said cap end of said tube to pressure said pin into said spring, which pressures said ball into said ball detent to hold said plunger in a loaded position in said plunger housing, and wherein said second end of said tether cable is attached to said cap.

14. The emergency brake device of claim 13, wherein said pin retainer is a flexible cap which is inserted into said tube and retains said pin, release spring and ball in said tube due to frictional forces between said flexible cap and said tube.

15. The emergency brake device of claim 14, further including a retaining cap head attached to said cap end of said tube for receiving said cap; wherein said retaining cap head includes an edge; and wherein said cap includes a hollow cavity which fits over said retaining cap head; where said cap includes a lip to catch said edge of said retaining cap head; and wherein said cap includes a pressure stud in said hollow cavity of said cap to pressure said pin.

16. The emergency brake device of claim 15, wherein said impact point part is a handle bar of said vehicle.

17. The emergency brake device of claim 14, wherein said impact point part is a handle bar of said vehicle.

18. The emergency brake device of claim 13, further including a retaining cap head attached to said cap end of said tube for receiving said cap; wherein said retaining cap head includes an edge; and wherein said cap includes a hollow cavity which fits over said retaining cap head; where said cap includes a lip to catch said edge of said retaining cap head; and wherein said cap includes a pressure stud in said hollow cavity of said cap to pressure said pin.

19. The emergency brake device of claim 18, wherein said impact point part is a handle bar of said vehicle.

20. The emergency brake device of claim 1, wherein said impact point part is a handle bar of said vehicle.

* * * * *